(12) United States Patent
Carponcin et al.

(10) Patent No.: US 11,505,340 B2
(45) Date of Patent: Nov. 22, 2022

(54) METHOD FOR BUILDING LARGE-DIMENSION STRUCTURES IN SPACE

(71) Applicant: Airbus Defence and Space SAS, Toulouse (FR)

(72) Inventors: Delphine Carponcin, Toulouse (FR); Christophe Figus, Toulouse (FR)

(73) Assignee: AIRBUS DEFENCE AND SPACE SAS, Toulouse ( * ) Notice: Subject to any disclaimer, the term of this patent is extended or adjusted under 35 U.S.C. 154(b) by 391 days.

(21) Appl. No.: 16/637,473

(22) PCT Filed: Aug. 7, 2018

(86) PCT No.: PCT/FR2018/052032
§ 371 (c)(1),
(2) Date: Feb. 7, 2020

(87) PCT Pub. No.: WO2019/030455
PCT Pub. Date: Feb. 14, 2019

(65) Prior Publication Data
US 2020/0247565 A1    Aug. 6, 2020

(30) Foreign Application Priority Data
Aug. 10, 2017   (FR) ...................... 1757634

(51) Int. Cl.
| B64G 4/00 | (2006.01) |
| B21F 1/00 | (2006.01) |
| B64G 99/00 | (2009.01) |
| B64G 1/22 | (2006.01) |

(52) U.S. Cl.
CPC ............... *B64G 4/00* (2013.01); *B21F 1/008* (2013.01); *B64G 99/00* (2022.08); *B64G 1/222* (2013.01)

(58) Field of Classification Search
CPC .. B64G 1/222; B64G 4/00; B64G 9/00; B21F 1/008
USPC ...................................... 244/172.6
See application file for complete search history.

(56) References Cited

U.S. PATENT DOCUMENTS

| 3,913,105 | A | * | 10/1975 | Williamson | ......... | H01Q 15/161 |
| | | | | | | 343/915 |
| 4,079,560 | A | * | 3/1978 | Weismann | ............... | E04C 2/22 |
| | | | | | | 52/309.7 |
| 4,337,560 | A | * | 7/1982 | Slysh | .................. | E04H 12/182 |
| | | | | | | 343/915 |
| 4,386,485 | A | * | 6/1983 | Kramer | ................ | E04H 12/185 |
| | | | | | | 52/632 |
| 7,617,639 | B1 | * | 11/2009 | Pollard | .................. | B64G 1/222 |
| | | | | | | 343/915 |

(Continued)

OTHER PUBLICATIONS

French and English International Search Report for PCT/FR2018/052032 dated Oct. 30, 2018, 4 pages.

(Continued)

*Primary Examiner* — Brady W Frazier
(74) *Attorney, Agent, or Firm* — Nixon & Vanderhye P.C.

(57) ABSTRACT

A method for manufacturing in space a rigid structure having a lattice is disclosed. The method includes creating of at least two framework elements from a coil of metal strip or wire, and creating of the lattice by cold-connecting the framework elements.

13 Claims, 6 Drawing Sheets

(56) References Cited

U.S. PATENT DOCUMENTS

| | | | |
|---|---|---|---|
| 8,042,305 B2* | 10/2011 | Pryor | B64G 1/222 |
| | | | 244/172.6 |
| 8,904,722 B2* | 12/2014 | Smith | E04H 12/16 |
| | | | 52/114 |
| 9,669,949 B2* | 6/2017 | Baudasse | E04C 3/005 |
| 2002/0112417 A1 | 8/2002 | Brown et al. | |
| 2005/0126106 A1* | 6/2005 | Murphy | B64G 1/222 |
| | | | 52/652.1 |
| 2006/0207189 A1 | 9/2006 | Pryor et al. | |
| 2012/0292449 A1 | 11/2012 | Levin et al. | |
| 2015/0076732 A1 | 3/2015 | Kemmer et al. | |
| 2016/0023781 A1* | 1/2016 | Baudasse | B64G 1/44 |
| | | | 52/108 |
| 2016/0185471 A1 | 6/2016 | Blincow | |
| 2017/0036783 A1 | 2/2017 | Snyder | |

OTHER PUBLICATIONS

French Search Report and Written Opinion for FR1757634 dated May 3, 2018, 8 pages.

Tamir et al., "In-Space Welding Visions & Realities", Thirtieth Space Congress "Yesterday's Vision is Tomorrow's Reality", Advanced Technology Development Session, Apr. 27-30, 1993, 8 pages.

\* cited by examiner

METHOD FOR BUILDING LARGE-DIMENSION STRUCTURES IN SPACE

CROSS REFERENCE TO RELATED APPLICATIONS

The present application is a National Phase of International Application Number PCT/FR2018/052032 filed Aug. 7, 2018, which designated the U.S. and claims priority benefits from French Patent Application Number No. FR 17 57634 filed Aug. 10, 2017, the entire contents of each of which are hereby incorporated by reference.

FIELD OF THE INVENTION

The invention relates to a method for in-space manufacturing a rigid structure comprising a lattice, and a structure obtained by this method. The invention also relates to a machine for manufacturing such a structure.

The invention applies in particular to the manufacturing of large-dimension structures such as antenna reflectors, optical mirrors, or even structures for connecting satellites of a satellite constellation.

PRIOR ART

For a large number of applications, it is desirable to install large-dimension structures in space, and in particular structures whose dimensions may exceed the characteristic dimension of a launcher nose cone, about 5 meters.

To do this, it is currently known to create foldable structures on the ground so that they can be contained in a launcher nose cone, then deployed in space. This is the case for antenna reflectors or mirrors. This solution is unsatisfactory, however, because the foldable constraint on a structure requires it to be more complex to design and produce, and does not allow fully overcoming the dimensional constraints related to the dimensions of the nose cone of a launcher.

To overcome these constraints, research efforts are being made to develop systems for manufacturing and assembling structures in space.

For example, there are known structure manufacturing solutions based on the technique of additive manufacturing (or 3D printing) of thermoplastic materials, possibly reinforced with carbon fibers. These solutions have the advantage of allowing the creation and assembly of large-dimension structures, by moderately heating the material (typically below 300° C.) compared to additive metal manufacturing.

These solutions have significant drawbacks, however. First, thermoplastic materials are poorly suited to space environments. Large-dimension structures installed in space are exposed to significant electromagnetic flux which tends to charge them with ionized particles; however, thermoplastic materials have an electrical conductivity that is too low to allow these electrical charges to flow when the dimensions of these structures become substantial. Another disadvantage of these materials is that their high sensitivity to ultraviolet and atomic oxygen tends to shorten the lifespan of the structures obtained.

In addition, thermal variations are very significant in space, so the materials used must have a low coefficient of thermal expansion in order to limit the thermal expansion of the structures, which is not the case for thermoplastic materials not reinforced with carbon fibers. The structures produced with this technology are therefore liable to deform, which causes dimensional uncertainty which is unacceptable, particularly for optical mirrors or antenna reflectors.

To increase the lifespan of these structures in a space environment and increase their surface electrical conductivity, it has been proposed to coat the assembled elements with a metal layer. However, the deposition of a metal layer in orbit is likely to generate contaminants on neighboring optical surfaces or sensors.

Metal is therefore a material of interest for the manufacturing of large-dimension structures in orbit. However, shaping it by Additive Layer Manufacturing or 3D printing requires heating to temperatures well above the usage temperature of the structures obtained, and also leads to deformation of the material during cooling which contributes to the dimensional uncertainty of the structure.

The melting of all the material as required by the 3D printing process is therefore time-consuming and energy-consuming. In addition, the cooling of the heated metal in space can only be achieved by radiation and not by convection, which can take even longer.

Finally, the shaping of metals by additive manufacturing leads to deterioration of the surface condition of the metal material, due to its melting and cooling. In addition, this method remains likely to generate fumes contaminating the surfaces of neighboring optics or sensors.

Also known from document US 20160185471 is a method for manufacturing a structure in space by assembling a set of elements which are prefabricated on the ground and carried in a launcher. This type of construction is restrictive because it logistically requires a large number of different parts, and is therefore not optimal in terms of mass.

Presentation of the Invention

The invention aims to at least partially overcome the disadvantages of the prior art.

In particular, one aim of the invention is to propose a method for manufacturing large-dimension structures in space which is less energy-consuming and less costly than the prior art.

Another aim of the invention is to propose a manufacturing method adaptable to a wide variety of structures and functions.

Another aim of the invention is to propose a manufacturing method that does not involve the input of heat.

Another aim of the invention is to provide structures having improved lifespan and dimensional stability, and a satisfactory electrical conductivity for discharging the ionized particles accumulated during exposure to electromagnetic fields. In this regard, the object of the invention is a method for manufacturing in space a rigid structure comprising a lattice, characterized in that it comprises:
- the creation of at least two framework elements from a coil of metal strip or wire, and
- the creation of the lattice by cold-connecting the framework elements.

Advantageously, but optionally, the manufacturing method may further comprise at least one of the following features:
- the creation of each framework element may comprise the following steps:
  - unrolling and extending a length of metal strip or wire,
  - cutting said length of metal strip or wire.
- the creation of each framework element may further comprise a step of folding the cut length of metal strip or wire in at least one fold orthogonal to the main direction of the cut length of metal strip or wire.

each framework element may be created from a coil of metal strip, and the creation of each framework element then comprises a step of folding the cut length of metal strip along a fold parallel to the main direction of said length in order to give it an L-shaped cross-section.

the method may further comprise the cold-connecting of framework elements to form a plurality of basic structural modules, and the cold-connecting of basic structural modules so as to form the lattice.

the cold-connection may be implemented by stapling, clinching, magnetic fastening, or cold welding by molecular adhesion.

the method may further comprise the attachment to the lattice of at least one functional tile from the group comprising:
- an antenna reflector tile comprising a metal grid suitable for reflecting radiofrequency waves,
- an optical reflector tile comprising an optical surface reflecting in the visible range,
- a protective tile comprising a frame on which is stretched a single- or multi-layer insulation sheet,
- a screen tile comprising a dense surface with or without emissive surface treatment for protection against micrometeorites.

the attachment of a tile on the lattice is advantageously reversible, and can be implemented by cold welding by molecular adhesion, magnetic attachment, or by means of a clip, double-sided adhesive, or hook-and-loop strips.

the material of the metal strip or wire may be Invar, titanium, an aluminum-based alloy, or a carbon-based alloy.

The invention also relates to a rigid structure comprising a lattice, characterized in that it is obtained by implementing the method according to the preceding description.

In some embodiments, the rigid structure may be an optical mirror, an antenna reflector, a protective screen, a space habitat, or a structure for connecting satellites of a satellite constellation.

Advantageously, the rigid structure comprises a lattice and at least one functional tile fixed to the lattice, and each functional tile comprises a tile positioning device and a wireless communication device which are self-sufficient in terms of energy.

The invention also relates to a machine for manufacturing a rigid structure in space, comprising:
- a reel for dispensing a metal strip or wire,
- a device suitable for unwinding a portion of strip or wire,
- a tool for cutting the metal strip or wire, and
- assembly equipment comprising at least one articulated arm suitable for cold-connecting two framework elements formed from metal strip or wire, and
- a dimensional control member for verifying the dimensions of the structure during manufacturing, the machine being suitable for implementing the method according to the preceding description.

Advantageously, the manufacturing machine further comprises a remote communication interface suitable for receiving control instructions from the ground.

The invention also relates to a satellite comprising a manufacturing machine according to the above description.

Another object of the invention relates to a method for controlling, from the ground, a machine for manufacturing a structure in space, comprising the sending to the machine of a sequence of instructions configured for implementing the method according to the preceding description.

The proposed method allows the creation of large-dimension structures with minimal energy input, because the assembly of the framework elements is carried out in the cold state. The elimination of the input of heat also makes it possible to eliminate the problems of heat dissipation, modification of the surface condition of the metal, and the generation of fumes which could generate contamination (particularly of optical equipment located nearby). It also makes it possible to reduce deformations of the structure during manufacturing. The time required to complete the structure is also shortened.

The structure obtained by the method comprises a support lattice which can be made operable in many different ways by fixing functional tiles to it, for example to form an antenna reflector, a mirror, or even a habitat structure.

As the support lattice is formed from a metal strip or wire unwound in space, only the tiles and the metal strip or wire must be conveyed by a launcher, and the dimensional constraints related to the dimensions of the launcher nose cone are eliminated.

It is thus possible to produce lattices whose geometry and dimensions are determined according to needs and according to transportation constraints, which makes it possible to envisage novel structure shapes. In particular, the lattices can be designed to minimize the energy, mass of material, and time necessary for their production, while minimizing potential deformations of the structure.

In addition, the fact that the lattice is made from a metal strip or wire ensures good electrical conductivity and, depending on the metal used, also makes it possible to obtain a sufficiently low coefficient of thermal expansion to reduce its deformations as thermal variations occur in space.

In one embodiment, the cold-connecting of the framework elements is carried out by molecular adhesion. Low-pressure contact between two framework elements is then sufficient to assemble them together, which represents a low expenditure of energy.

In one embodiment, the framework elements used are formed from a strip folded along its length to present an L-shaped cross-section. This increases the stiffness of the lattice obtained while reducing the amount of material necessary for its production.

Furthermore, not only does the proposed manufacturing machine enables producing such a structure in space, but also carrying out dimensional verifications throughout its production.

DESCRIPTION OF FIGURES

Other features, aims, and advantages of the invention will emerge from the description which follows, which is purely illustrative and not limiting, and which is to be read with reference to the appended drawings in which.

DETAILED DESCRIPTION OF AT LEAST ONE EMBODIMENT

Method for Manufacturing Structures in Space

Figure 5:
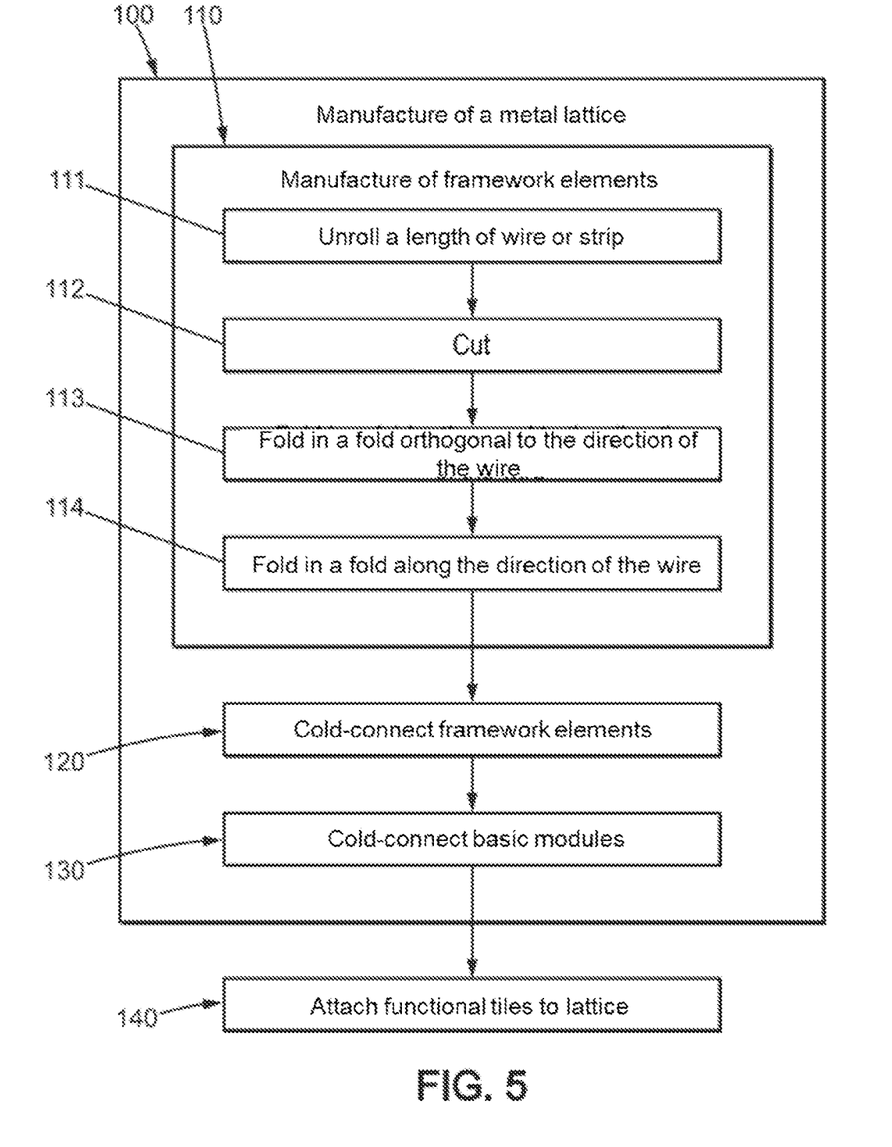
FIG. 5 schematically represents the main steps of the manufacturing method according to one embodiment of the invention.

With reference to FIG. 5, we will now describe a method for manufacturing structures in space.

"In space" is understood to mean the part of the universe located beyond the Earth's atmosphere, and located outside any vehicle or housing structure located in space such as the international space station.

This manufacturing method makes it possible to manufacture a rigid structure 1 comprising a metal lattice 10, and in certain embodiments at least one functional tile 20 fixed to the lattice.

"Rigid structure" is understood to mean a structure devoid of hinges, since as we will see the manufacturing method makes it possible to manufacture a large-dimension structure directly in space, without the need to transport this structure in folded form inside a launcher nose cone.

The manufacturing method therefore comprises a step 100 of manufacturing a metal lattice 10. This step comprises the manufacturing 110 of at least two framework elements 11 from a metal strip or metal wire unwound from a reel.

The metal strip or wire is selected among materials having a low coefficient of thermal expansion, preferably less than $5.10^{-6}$ $K^{-1}$, making it possible to prevent the lattice from being deformed during temperature variations in space.

Advantageously, the metal strip or wire is made of an alloy of iron and nickel in the respective proportions of 64 and 36%, known under the commercial name of Invar™, because it has a very low coefficient of thermal expansion of less than $2.10^{-6}$ $K^{-1}$. Alternatively, the material selected for the metal strip or wire may be titanium, or an aluminum-based alloy, or even an alloy loaded with carbon such as steel.

Each framework element 11 is obtained by unrolling a length L of metal strip or wire and straightening this length during a step 111, then cutting this length during a step 112.

Advantageously, the manufacturing 110 of a framework element 11 further comprises at least one folding 113 of the length of metal strip or wire, the length then having at least two portions forming an angle relative to one another. The fold is made in a direction orthogonal to the main direction of the cut length of metal strip or wire.

Figure 1A:
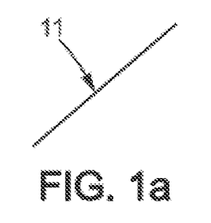
FIGS. 1a to 1d represent examples of framework elements produced during implementation of the manufacturing method according to the invention.
Figure 1B:
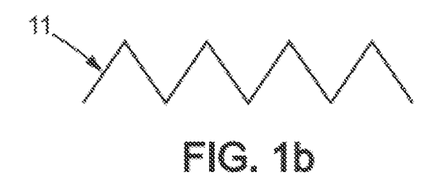
Figures 1C, 2A:
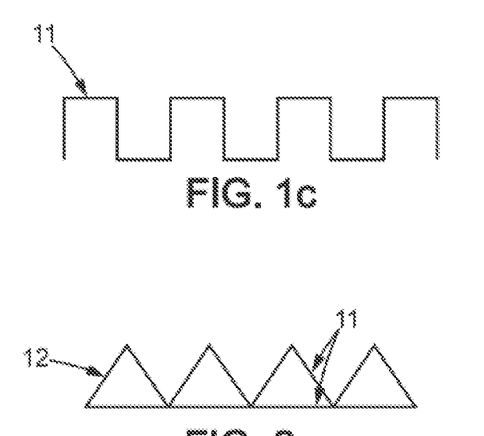
FIGS. 2a and 2b show two examples of basic modules produced during implementation of the manufacturing method according to one embodiment of the invention.

Examples of framework elements 11 are shown in FIGS. 1a and 1b. In FIG. 1a, a framework element 11 is formed by a length of straight wire. In FIGS. 1b and 1c, the framework element 11 is formed by a length of wire which has been folded at regular intervals to form a periodic geometric pattern, in this case a triangle in FIG. 1b and a square in FIG. 1c.

Figure 1D:
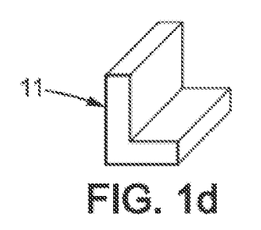

Advantageously, in the case where a framework element 11 is created from a coiled metal strip, the manufacturing 110 of the element also comprises a step 114 of folding the metal strip, the fold extending along the main direction of the cut length of strip to give the strip an L-shaped cross-section, as in FIG. 1d, or possibly U-shaped.

This increases the stiffness of the strip which is then used to form a framework element 11. This step is therefore implemented, where appropriate, before the folding step 113 described above.

Alternatively, and preferably in the case where the framework element 11 is formed by metal wire, this wire may be twisted to provide increased stiffness. In this case, the method may comprise a step consisting of twisting the wire before the implementation of step 113.

Once at least two framework elements 11 are obtained, the manufacturing method comprises a step 120 of assembling these framework elements. This assembly is carried out in the cold state, meaning cold-connection without any contribution of heat. In space, it is understood that this assembly is therefore carried out at a temperature below the melting temperature of the material forming the wire or strip.

This makes it possible to reduce the amount of energy required to implement the method, but also to avoid any release of fumes which could cover the neighboring optics and sensors. By avoiding the use of welding which involves the melting of metal, we also avoid degrading the surface condition of the melted then cooled metal. The method therefore does not require heat treatment or the deposition of an additional coating.

The assembly of two framework elements can be achieved in several ways, for example by clinching, which is assembling by locally pressing two parts together using a punch. By exerting pressure on the two parts with the punch, the part in contact with the punch deforms locally to clinch the other part.

In a particularly advantageous variant of the assembling, the pressure exerted against the two parts is reduced compared to a clinching operation, in order to assemble the framework elements by molecular adhesion without deforming them (or with greatly reduced deformation compared to a clinching operation). In this case we speak of cold welding by molecular adhesion, which is achievable due to Van des Waals forces. Indeed, while in the Earth's atmosphere, Van der Waals forces are considerably reduced by the presence of dust or thin layers of oxidation which are created or permanently deposited on metallic surfaces; in space this phenomenon is greatly reduced, so the effect of Van der Waals forces appears more intensely. A slight pressure exerted on certain metal framework elements therefore makes it possible to assemble the parts together.

In a less preferred variant, assembling may be carried out by stapling, in other words by attaching a staple which keeps the two framework elements in contact. The assembly may also be achieved by magnetic attachment, obtained by fixing magnets to the framework elements. The assembly may also be carried out by tying, two framework elements being tied together with a length of wire also taken from the reel and possibly twisted.

According to another variant, assembling may be carried out by fitting together two framework elements. The ends of the framework elements must then have alternating male and female geometries, which can be created by dedicated stamping tools.

Figures 2B, 3:
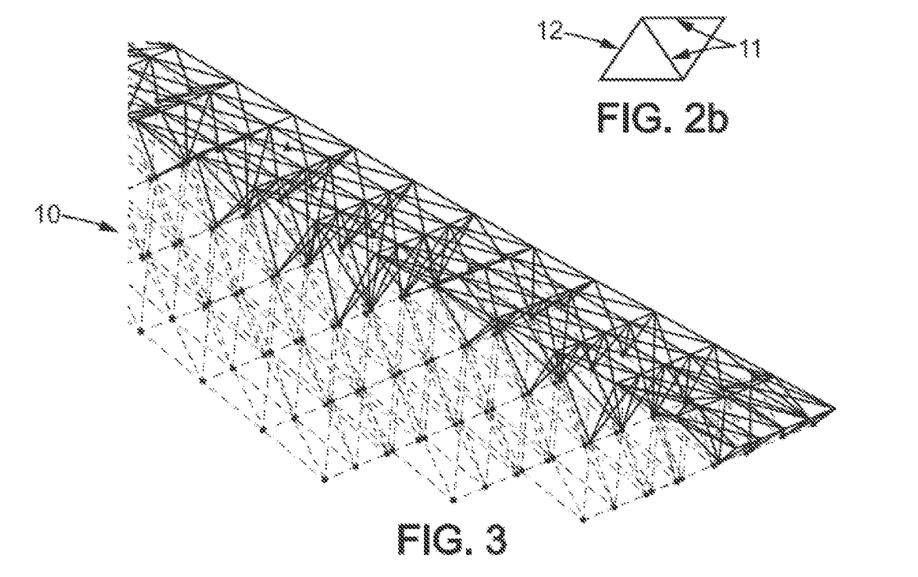
FIG. 3 represents an example of a lattice obtained by implementing the method.

According to an advantageous embodiment of the method, framework elements 11 are assembled together to form a plurality of basic modules 12 during step 120, then the basic modules 12 are assembled together during a step 130 to form the lattice. This makes it possible to design simple lattices that are easy to produce, while being modular so as to adapt to different expected functions or applications. Examples of basic modules are shown in FIGS. 2a and 2b, and an example of the lattice is shown in FIG. 3.

The assembly of basic modules is also carried out in the cold state, and by the same assembly methods as those described above for the assembly of framework elements.

The lattice 10 obtained by implementing this method is a rigid structure, in other words it does not comprise any hinges or other means intended to make it foldable, and can be used as is, for example to connect two satellites of a satellite constellation to one another, or as a carrying structure whose position would be determined and to which one could attach payloads as needed, for example such as electronic emission, reception, or transmission units.

It is therefore understood that the lattice can be designed with an eye to the function it is to fulfill. In particular, the framework elements 11, the basic modules 12, and the lattice itself 10 may be of variable dimensions and shapes in order to adapt to the function which the lattice is to fulfill.

The dimensional constraints related to the transport in space of a structure made on earth also disappear. For example, a lattice connecting together several satellites of a constellation can extend over several hundred meters.

The lattice 10 may also constitute a support structure on which is fixed at least one functional tile 20, and preferably a plurality of functional tiles 20, during a step 200. Examples of structures comprising a lattice and one or more functional tiles are shown in FIGS. 4a to 4c.

The functional tiles 20 are preferably produced on the ground and transported to the lattice 10 for attachment thereto.

The structure of a functional tile 20 varies depending on the expected role of the tile.

Figure 4A:
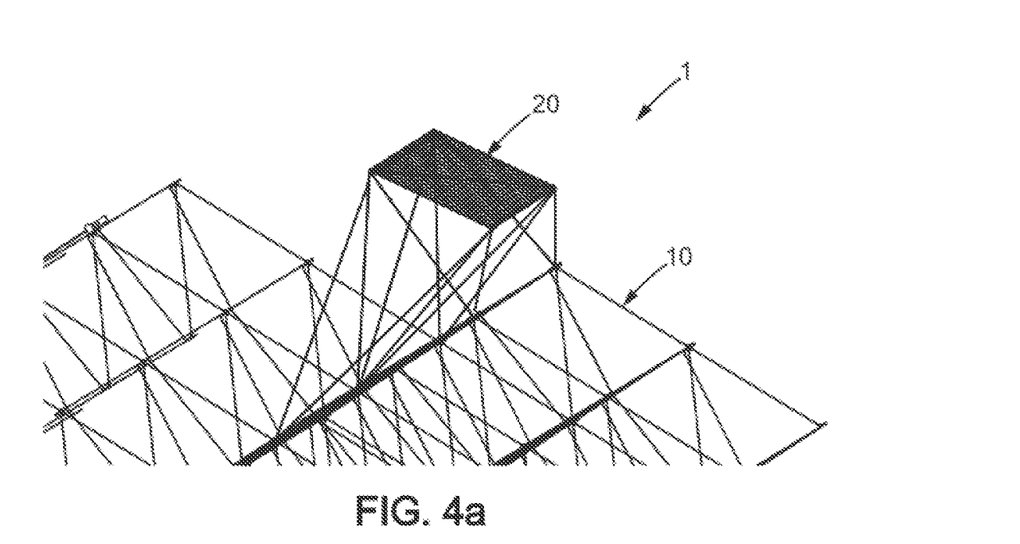
FIGS. 4a to 4c show examples of structures respectively comprising a lattice and one or more functional tiles.
Figure 4B:
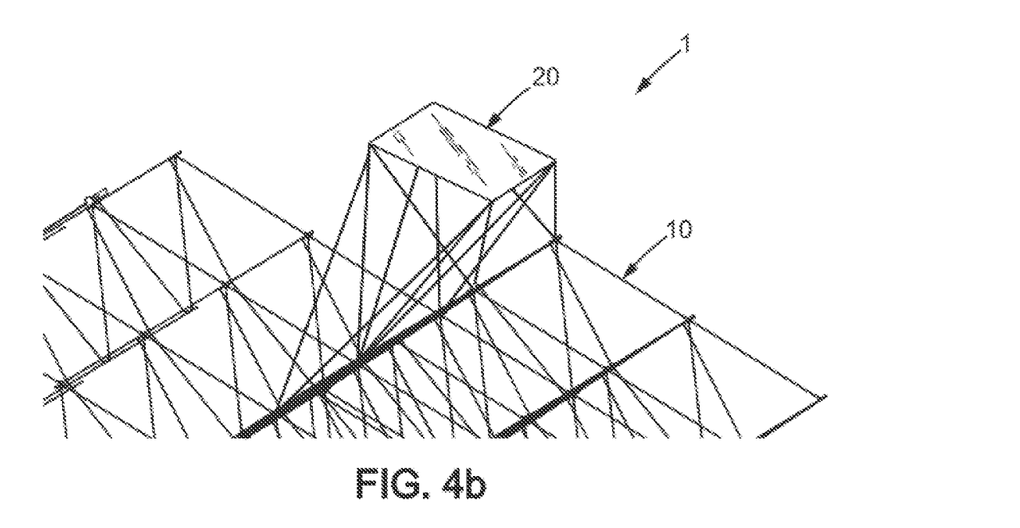
Figure 4C:
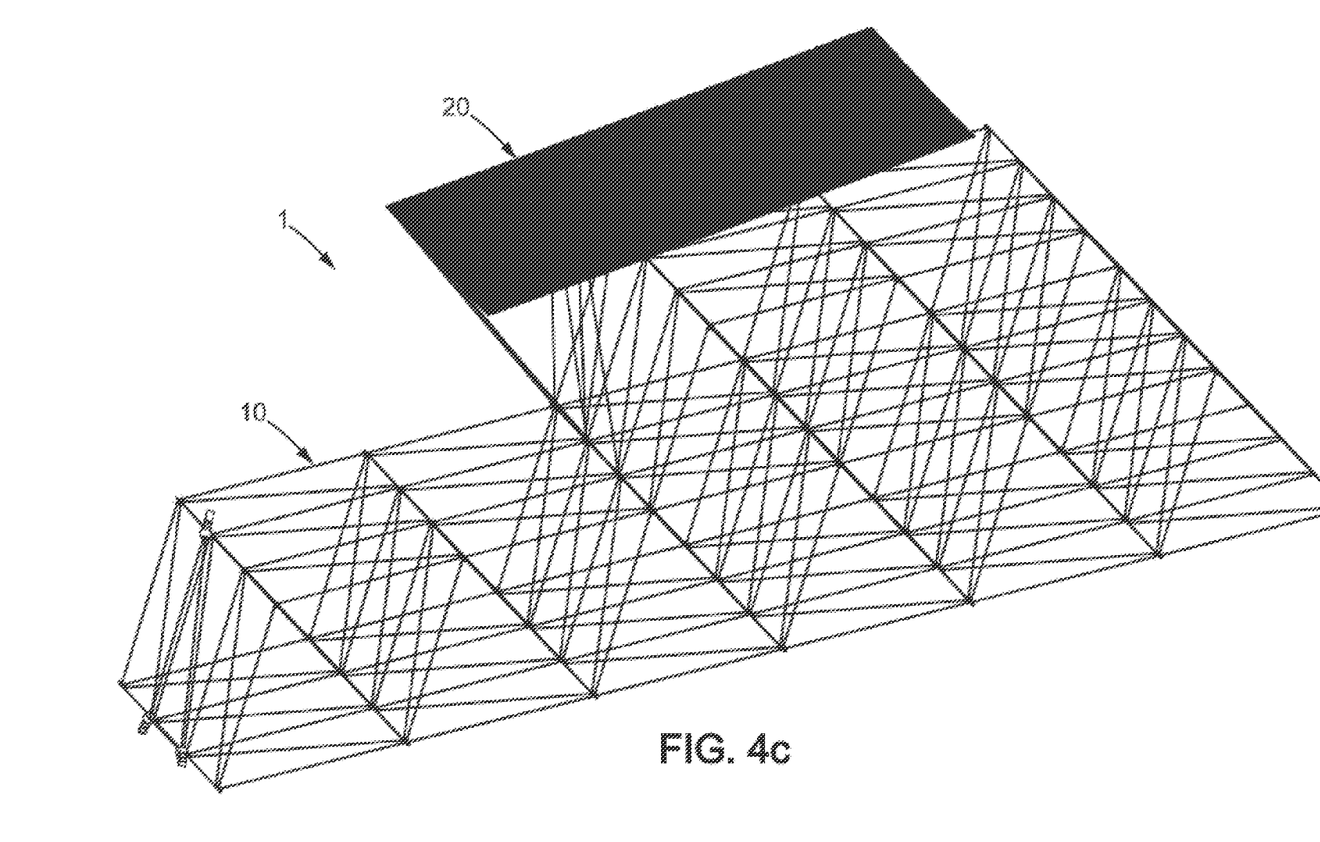

For example, according to one embodiment, the tile may be a radiofrequency antenna reflector tile, and in this case comprises a metal grid having a mesh size adapted to the frequency of application (for example 5 mm by 5 mm in the S band), as is schematically represented in FIG. 4a.

Alternatively, the tile may be an optical reflector tile, to fulfill the functions of mirror, radiator, or shield, as schematically represented in FIG. 4b. The tile then comprises a reflective optical surface for wavelengths in the visible range. This optical surface may be made reflective by polishing, or may be aluminized, or may be painted.

According to yet another variant, the tile may further comprise a frame on which a flexible protection is stretched, for example a single-layer insulation (SLI) or multi-layer insulation (MLI) covering sheet, for screen applications, space habitat applications, etc.

The tile may also be a screen tile comprising a dense surface, meaning without any openings, with or without emissive surface treatment. These tiles may for example comprise a surface formed by an aluminum layer about a millimeter thick, and can be used as protections against micrometeorites.

The attachment of each functional tile to the lattice is advantageously carried out by reversible assembly, so that a tile can be removed when necessary to repair or replace it.

In this regard, the assembly may be carried out by magnetic fastening, by means of clips or clamps, double-sided adhesive strips, or hook-and-loop strips, or even by cold welding by molecular adhesion as described above. Indeed, by exerting force to separate the parts it is possible to overcome the Van der Waals forces.

Advantageously, each tile 20 may also comprise an actuation device and a means of remote communication which are self-sufficient in terms of energy. The tile comprises a photovoltaic sensor and a battery which are adapted to supply the actuation device and/or the means of remote communication when such is necessary.

This is particularly advantageous in the case of tiles 20 with an optical function, since it allows obtaining an adaptive optics system controlled in real time from the ground, making it possible to adjust the orientation of the tiles and to correct alignment defects that may be generated during their assembly on the mirror.

The steps of manufacturing 110 and assembling 120, 130 the framework elements or modules, and where appropriate attaching the functional tiles 200, described above, are all carried out in space. To do this, a manufacturing machine suitable for implementing the method is described below with reference to FIG. 6. This machine is advantageously carried by a space station in orbit, on an external wall thereof, or on a satellite.

Structure Manufacturing Machine

Figure 6:
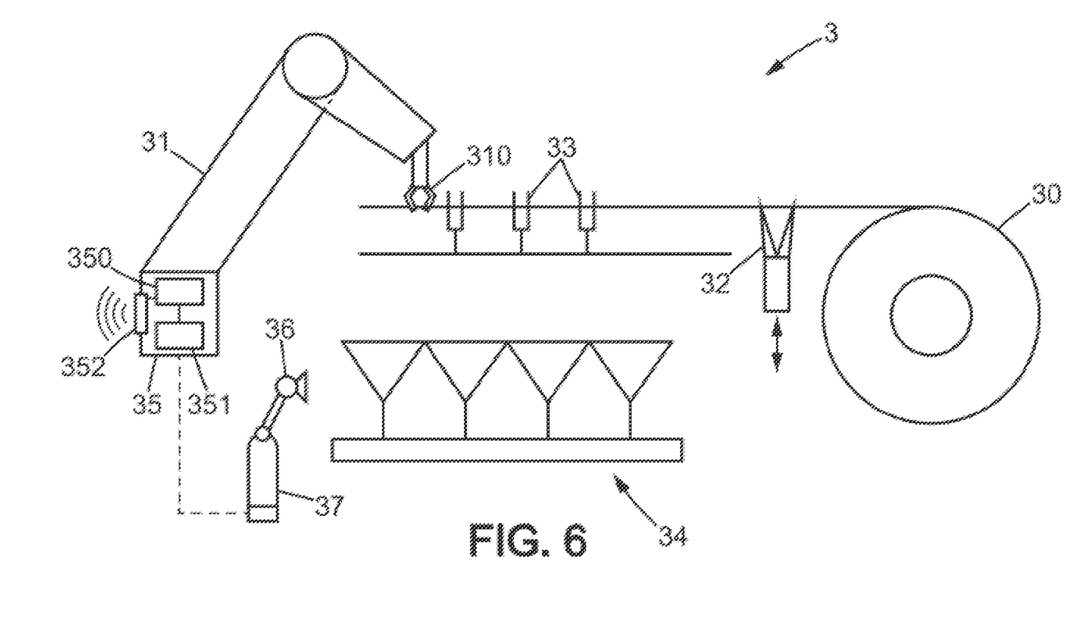
FIG. 6 schematically represents an example of a machine for manufacturing a structure according to one embodiment of the invention.

The machine 3 comprises a reel 30 on which is wound a metal strip or wire. It also comprises a device 31 for unwinding the wire or strip from the reel, this device for example comprising a fixed mechanism suitable for unwinding the wire or strip continuously, or alternatively an articulated arm 31 provided with gripping fingers 310, suitable for gripping and moving a portion of metal strip or wire. The arm can thus grasp one end of the wire and unwind it from the reel 30.

The machine 3 further comprises a cutting tool 32, suitable for cutting a length of metal strip or wire.

Advantageously, the machine 3 is also suitable for bending a cut length of metal strip or wire so that this length has several portions forming an angle relative to one another. In this regard, the machine 3 may comprise gripping fingers 33 suitable for gripping a portion of the wire or strip. The articulated arm 31 can grasp a portion of wire to be folded relative to the portion grasped by the fingers 33, and pivot by a desired angle to form the fold.

The machine 3 may also be adapted to fold lengthwise a cut length of metal strip, to give the strip an L-shaped or U-shaped cross-section. In this regard, it may comprise a press (not shown) shaped to allow this folding by means of stamping or rollers imposing the desired shape on the strip such that the folding is performed continuously.

The machine 3 comprises assembly equipment 34 suitable for cold-connecting two framework elements or two basic modules formed from the metal strip or wire. The assembly equipment depends on the type of assembly which is implemented, but it preferably comprises at least one articulated arm which allows manipulating and moving one framework element or basic module relative to another.

For example, in the case of assembly by cold welding by molecular adhesion, the assembly equipment 34 may comprise a support table provided with gripping fingers adapted to hold a first framework element or a first basic module in position, an articulated arm adapted to position a second framework element or basic module relative to the first, and a clamp adapted to exert pressure on the two framework elements or basic modules at a plurality of points in order to achieve the assembly.

Alternatively, if the assembly is performed by clinching, the clamp may be replaced by a press provided with a punch. Alternatively, if the assembly is carried out by stapling, the assembly equipment 34 includes a reserve of staples and another articulated arm adapted to take a staple and fix it to the elements or modules to be assembled.

The assembly equipment 34 of the machine is preferably further adapted to assemble tiles on the lattice; for this, the articulated arm may be provided with a suction cup to grasp, position, and deposit a tile relative to the lattice.

The machine 3 is advantageously autonomous or controllable from the Earth to allow remote implementation of the method for manufacturing structures described above. In this regard, the machine 3 preferably comprises a control unit 35 comprising a computer 350, a memory 351, and an interface for communication 352 with the Earth, preferably comprising an antenna for transmitting and receiving radio waves. The communication interface is adapted to receive instructions for controlling the machine, said instructions being processed by the computer 36 in order to implement the method. The computer is adapted to control the operation of the machine components according to the control instructions received, to implement the production of a structure.

The machine 3 can thus be controlled remotely for the manufacture of a structure in space, by sending instructions to the machine from a command center on the ground.

Advantageously, the machine 3 also comprises a dimensional control member 36 for verifying the dimensions of the structure during manufacturing, adapted to verify the dimensions of the structure in situ. This dimensional control member is preferably controlled by the control unit 35 in a closed loop, so that the shape of the structure can be checked and corrected as the structure is assembled, the assembly of a new element to the structure being carried out while taking into account faults in the previous assembly in order to compensate for them.

The dimensional control member is advantageously chosen among the following technologies:
  Laser transmitter/reflector, optionally with surface scanning functionality,
  Dimensional control by triangulation, comprising three cameras and a set of targets,
  Dimensional control by photogrammetry,
  Local geolocation system using infrared laser transmitters (for example the technology from the Nikon company sold under the name iGPS)
  Ultrasonic triangulation,
  Stereoscopic camera.

Referring to FIG. 6, the dimensional control member 36 is preferably mounted on an articulated arm 37 in order to be able to be positioned in the desired position relative to the structure during manufacturing.

Figure 7:
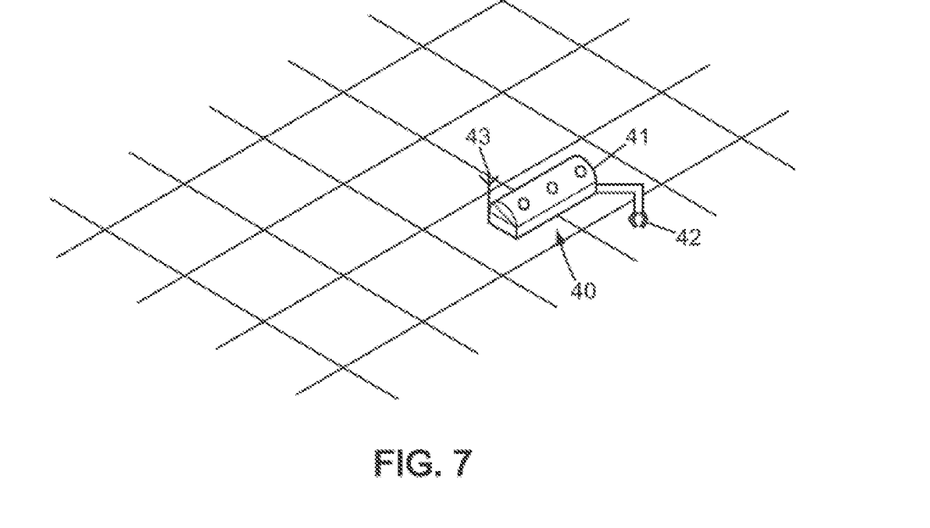
FIG. 7 schematically illustrates an example of a structure inspection robot.

Advantageously, with reference to FIG. 7, an overall dimensional control of the structure at the end of manufacturing may be carried out by an inspection robot 40, configured to be able to move relative to the structure in order to scan the entire surface of the structure, to verify for example the positioning and quality of the tiles.

To do this, the inspection robot may be adapted to move about on the structure, or to move about at a distance from it like a drone.

Preferably, this robot may also be configured to manipulate the tiles, in order to change the tiles or their orientation. The robot therefore comprises dimensional control means 41, which can be chosen among the technologies mentioned above for the dimensional control member 36, tile manipulation means 42, and a control unit (not shown) comprising a computer and a remote connection interface 43 adapted to allow communication either between the inspection robot and the control unit 35 of the production machine 3, or between the inspection robot and a ground control center.

Preferably, the robot is advantageously self-sufficient in terms of energy, in order to eliminate all power cables. In this regard, it may comprise a battery and/or one or more photovoltaic sensors (not shown).

As the structure is created by assembling basic building blocks, and can therefore be large in size, the two proposed verification modes (on the manufacturing machine and dimensional control robot) allow correcting deviations originating from the manufacturing method during its implementation, at the level of each basic building block of the structure, and compensating for defects in the shape of the structure at the end of manufacturing in comparison to the initially desired geometry.

The invention claimed is:

1. A method for manufacturing in space a rigid structure comprising a lattice, comprising implementing, in space, steps of:
   creating a plurality of framework elements from a coil of metal strip or wire, the creation of each framework element comprising:
      unwinding and extending a length of metal strip or wire from said coil,
      cutting off said length of metal strip or wire, and
   creating the lattice by cold-connecting the plurality of framework elements to one another.

2. The manufacturing method according to claim 1, wherein the creation of each framework element further comprises folding the cut length of metal strip or wire in at least one fold orthogonal to the main direction of the cut length of metal strip or wire.

3. The manufacturing method according to claim 1, wherein each framework element is created from a coil of metal strip, and the creation of each framework element further comprises folding the cut length of metal strip along a fold parallel to the main direction of said length in order to give it an L-shaped cross-section.

4. The manufacturing method according to claim 1, wherein creating the lattice further comprises the cold-connecting framework elements to form a plurality of basic structural modules, and cold-connecting of basic structural modules so as to form the lattice.

5. The manufacturing method according to claim 1, wherein the cold-connection is implemented by stapling, clinching, magnetic fastening, or cold welding by molecular adhesion.

6. The manufacturing method according to claim 1, further comprising the attachment to the lattice of at least one functional tile from the group comprising:
   an antenna reflector tile comprising a metal grid suitable for reflecting radiofrequency waves,
   an optical reflector tile comprising an optical surface reflecting in the visible range,
   a protective tile comprising a frame on which is stretched a single- or multi-layer insulation sheet, or
   a screen tile comprising a dense surface with or without emissive surface treatment for protection against micrometeorites.

7. The manufacturing method according to claim 6, wherein the attachment of a tile on the lattice is reversible and implemented by cold welding by molecular adhesion, magnetic attachment, or by means of a clip, double-sided adhesive, or hook-and-loop strips.

8. The manufacturing method according to claim 1, wherein the material of the metal strip or wire is Invar, titanium, an aluminum-based alloy, or a carbon-based alloy.

9. A rigid structure comprising a lattice, the rigid structure being obtained by implementing the method according to claim 1, comprising a lattice and at least one functional tile fixed to the lattice, wherein the structure further comprises a robot configured to manipulate the at least one functional tile in order to change the at least one functional tile or its orientation, the robot comprising a battery and/or one or more photovoltaic-powered sensors.

10. A machine for manufacturing a rigid structure in space, comprising:
  a reel for dispensing a metal strip or wire,
  a device suitable for unwinding a portion of strip or wire,
  a tool for cutting the metal strip or wire, and
  assembly equipment comprising at least one articulated arm suitable for cold-connecting two framework elements formed from metal strip or wire, and
  a dimensional control member for verifying the dimensions of the structure during manufacturing,
  the machine being suitable for implementing a method for manufacturing in space a rigid structure comprising a lattice, comprising:
  creating at least two framework elements from a coil of metal strip or wire, and
  creating the lattice by cold-connecting the framework elements.

11. The machine according to claim 10, further comprising a remote communication interface suitable for receiving control instructions from the ground.

12. A satellite comprising a manufacturing machine according to claim 10.

13. A method for controlling, from the ground, a machine for manufacturing a structure in space, wherein the machine comprises:
  a reel for dispensing a metal strip or wire,
  a device suitable for unwinding a portion of strip or wire,
  a tool for cutting the metal strip or wire, and
  assembly equipment comprising at least one articulated arm suitable for cold-connecting two framework elements formed from metal strip or wire, and
  a dimensional control member for verifying the dimensions of the structure during manufacturing, and
  a remote communication interface suitable for receiving control instructions from the ground,
  the method comprising the sending to the machine of a sequence of instructions configured for implementing the method according to claim 1.

* * * * *